June 27, 1939.  A. McWALTERS  2,163,955

ANTIPILFERAGE DEVICE

Filed Aug. 18, 1938

INVENTOR
ANDREW McWALTERS
BY Paul, Paul, Moore & Griese
ATTORNEYS

Patented June 27, 1939

2,163,955

UNITED STATES PATENT OFFICE 2,163,955

ANTIPILFERAGE DEVICE

Andrew McWalters, Minneapolis, Minn.

Application August 18, 1938, Serial No. 225,560

6 Claims. (Cl. 70—232)

The present invention relates to anti-pilferage seals and closures for use wherever it is desirable to prevent unauthorized operation of an otherwise easily removable cap closure, or holding device.

In many common devices valuable goods and fluids are stored under conditions such that they may easily be obtained by tampering with the container in which stored, or the means of location. For example, gas lines into residences and business places customarily have a shut-off valve and a drain plug within the customer's premises between the meter and the gas main. Much gas is stolen by removing the drain plug and coupling a by-pass around the meter, or by removing one of the ports of the shut-off valve so as to permit ingress into the line.

Similarly, in the oil fields there are countless easily accessible oil lines into which access may readily be had by way of valves, exposed easily removable pipe fittings and the like. Again, at gasoline service stations there are usually many exposed pipes, valves and the like into which ingress may easily be had.

Another illustration of easy accessibility which permits pilferage is in connection with objects which are completely exposed, but bolted to some object which is not conveniently removable. An illustration of this are demountable wheels or spare wheels of automobiles, filling station appliances, weighing scales in semi-public places and countless similar objects.

In all of the foregoing and many similar instances which will be apparent to observant persons, pilferage is made easy by the fact that merely a bolt, nut, pipe cap, valve, or the like need be removed to permit removal of the valuable goods or fluid.

It is an object of the present invention to provide a sealing device for use with or in place of the customary bolt, nut, pipe cap, valve, or the like to prevent pilferage.

It is a further object of the invention to provide an anti-pilferage cover which may be locked in place over a port such as a nut, bolt, cap, valve port, or the like so as to prevent removal of such port.

It is a further object of the invention to provide an anti-pilferage cover which is freely rotatable so as to make turning of the covered port by the cover impossible.

It is a further object of the present invention to provide an anti-pilferage device in which the ports are locked in position by a ring member to prevent removal, and to provide means by which an authorized person may ingress.

It is a further object of the invention to provide a valve locking device for providing separation of a valve operating stem into a loose freely rotatable part and another part, and to provide means for locking said freely rotatable part out of engagement with said other part while in the freely rotatable position. It is a further object of the invention to provide in such a device, means for unlocking such freely rotatable part to permit rotation of said valve. It is a further object in such device to provide an assembly having a freely rotatable housing for covering accessible components of the valve.

It is an object of the invention in connection with any of the foregoing constructions to provide an unlocking means for permitting relative movement of said parts, and specifically to provide a locking ring and means for compressing the lock ring so as to permit removal of a closure or cover or to permit movement of one part relative to another, all for the purpose herein set forth.

Other and further objects are those inherent in and implied by the constructions herein described, illustrated and claimed.

The invention is illustrated with reference to the drawing in which

Figures 1, 2, 3, 4, 5, 6:
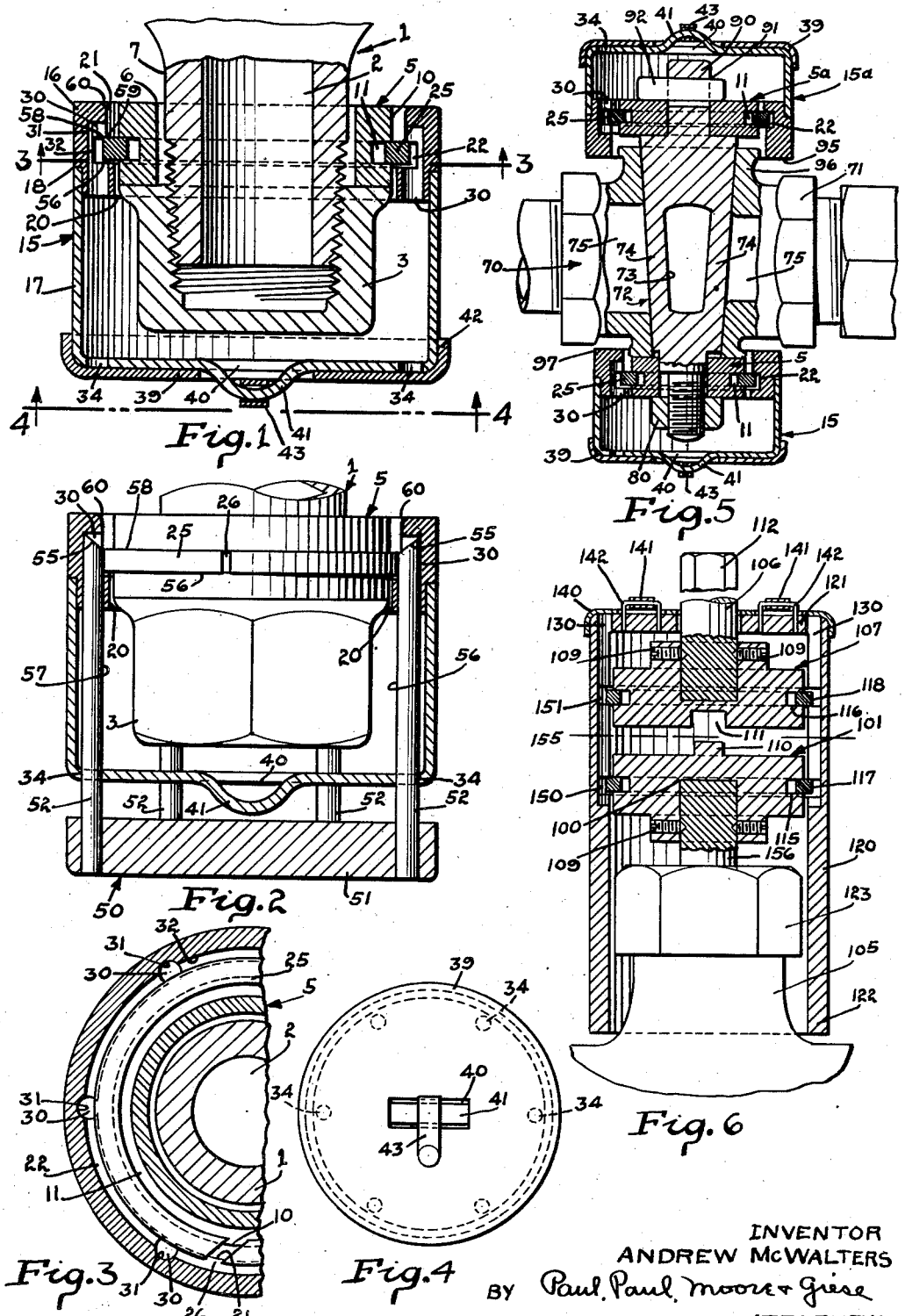
Figure 1 is a cross-sectional view in elevation of one type of sealing device made in accordance with my invention.
Figure 2 is an elevational view, partly in section of the device shown in Figure 1 showing the unlocking member in place.
Figure 3 is a fragmentary cross-sectional view along the lines 3—3 of Figure 1.
Figure 4 is a view in the direction of arrows 4—4 of Figure 1.
Figure 5 is an elevation view partly in section showing the sealing and locking device applied to a cut-off valve.
Figure 6 is an elevational view partly in section showing the sealing and locking device applied to a gate valve.

One form of the present invention is illustrated in Figures 1 through 4 which show the anti-pilferage device of the present invention applied to a fluid-carrying pipe. In this instance the fluid-carrying pipe is the lower drain-opening of a drain-L generally designated 1, such as is commonly installed between the street gas main and the customers' meters in residences and business establishments. The L 1 is provided with a downwardly extending channel 2 which is ordinarily capped by means of a cap 3. When water or other condensates accumulate in channel 2 the cap may be removed and the condensates drained from the system. When the cap 3 is left exposed gas may be stolen by coupling a hose onto channel 2 in place of the cap, and by-passing the gas.

The anti-pilferage device of the present invention comprises a cylindrical collar generally designated 5 which has an internal diameter 6 which is sufficiently large so that it fits loosely about the surface 7 of the drain-L 1, and is freely rotatable thereon. The collar is held in place behind cap 3. The collar 5 also has an outer cylindrical surface 10 which has formed therein a peripheral groove 11.

Circumscribing collar 5 is a cover device generally designated 15, which consists of a second cylindrical collar 16 and a stamped metal cup 17 which are permanently attached to each other, as shown at 18, by welding or the like. The cylindrical collar 16 has a small diameter 20 throughout a portion of its width and a somewhat larger diameter 21 throughout another portion of its width. Between surfaces 20 and 21 there is a groove 22 which is slightly wider than the groove 11 formed in collar 5.

The collar 5 is provided with a ring 25 which is split at 26 as shown in Figure 3. Ring 25 is of hardened steel or other similar material and is tensioned so that it will normally expand to the position shown in Figure 3 and thereby lie partly in slot 11 in collar 5 and partly in slot 22 in outer cylindrical member 16. However, the ring 25 is of such width and diameter that when the slot 26 is closed by compression the ring will have an outer diameter slightly less than that of surface 21 of outer cylindrical member 16.

The cover 15 is composed of cup 17 which is attached to cylindrical member 16. Member 16 has a plurality of holes 30 formed in it. Holes 30 are spaced evenly around the collar and intersect groove 22 in the cylindrical member 16. It will be noted that the portion 31 of holes 30 extends beyond the surface 32 which forms the bottom of groove 22 in the cylindrical member.

The cup 17 is provided with a purality of holes 34, one directly in line with each of holes 30. The diameter of holes 34 is preferably slightly larger than the diameter of holes 30 in the cylindrical member 16.

In Figure 1 the cover 15 is shown in assembled relation with respect to collar 5 and it will be noted that due to the tension of ring 25 it lies partly in groove 22 of the outer member 16 and partly in groove 11 of collar 5. As a consequence it is not possible to withdraw cover 15 from the collar 5 and access to cap 3 is therefore prevented. It will be noted that due to the peripheral orientation of grooves 22 and 11 the cover 15 is freely rotatable with respect to collar 5 and furthermore collar 5 is freely rotatable with respect to cap 3. As a consequence it is impossible to rotate cap 3 by rotating either the cover 15 or the collar 5 and unauthorized removal of cap 3 is therefore prevented.

In Figure 5 there is also illustrated a cover plate 39 which has a cut-out portion 40 (see Figure 4). The cutout portion is of a size and configuration such that it receives the loop 41 which is stamped into the lower surface of cup 17. The cover 19 is formed with an upwardly extended flange 42 by which it is neatly located upon cap 17 and the cover may be held in place by a tape seal 43 of the car-seal type.

In order to permit removal of cover 15 by an authorized person an unlocking arrangement is provided, as shown in Figure 2. In this view it will be noted that cover 39 has been removed from cap 17 and holes 34 in the cap are therefore exposed. The unlocking member generally designated 50 consists of a heavy circular plate 51 having mounted thereon a plurality of steel rods 52 which have a diameter such that they will slide easily into holes 30 in outer cylindrical member 16. The upper ends of each of the rods 22 are formed with a surface 55 which slants downwardly toward cap 3, as shown in Figure 2, and the surfaces 55 are hardened by case hardening or otherwise, so as to be able to resist scraping and deformation by the sharp edge of hardened steel ring 25. In use the unlocking device is inserted through holes 34 in cup 17 and then thrust upwardly until the surfaces 55 come in contact with edge 56 of ring 25. The circular plate 51 is then pushed in and ring 25 is accordingly contracted at a number of places about its periphery. It is therefore flexed and its outer diameter reduced. The distance between surface 57 of oppositely disposed rods 52 (which is the minimum distance between diametrically disposed rods) is slightly less than the diameter 21 and as a consequence the outer member 15 and the unlocking device 50 may be drawn downwardly as shown in Figure 2 until the upper edge 58 has moved upwardly beyond the corner 59 of slot 22 (see Figure 2). The ring 25 is thereafter maintained at the minimum diameter by inner surface 21 of outer cylindrical member 16 and the outer member 15 may accordingly be withdrawn downwardly out of engagement with collar 5. The authorized person may then make any desired adjustments to cap 3.

It will be noted that the surface 21 is rounded at 60 as shown in Figure 2, which serves to facilitate compression of ring 25 when cover 15 is reassembled on collar 5. In reassembling the anti-pilferage device the collar 5 is held in place and the outer member 15 moved upwardly so that ring 25 is compressed to the diameter of surface 21. The cover 15 is then moved upwardly until the ring snaps into groove 22 of cylindrical member 16. The cover plate 39 is then assembled and held in place by means of the carseal type strip 43.

It is obvious that the device just described may be utilized to cover a bolt head or nut rather than cap 3. In any event the collar 5 is placed behind the nut which is then drawn down and then the cover 15 snapped into place.

In Figure 5 there is illustrated the application of the present invention to a cut-off valve generally designated 70. Valves of this type consist of an outer body 71 and a conically shaped cut-off plug 72 having an opening 73 therein for the passage of fluids when the valve is in the open position. In Figure 5 the valve is illustrated in the closed position such that walls 74 block the passage of fluid through opening 75 in the valve body. The plug 72 is ordinarily held in place by a nut 80 and in applying the present invention to such a construction the nut 80 is removed and the collar, generally designated 5, of the anti-pilferage device, inserted behind the nut. The nut is then screwed down and the collar 5 is held in place. The cover member generally designated 15, of the anti-pilferage device, is then placed and is locked and held by ring 25 as described with reference to the device shown in Figures 1 and 4.

The anti-pilferage device adjacent nut 80 prevents the removal of plug 74 but it does not prevent rotation of the plug and there is accordingly a second anti-pilferage device placed over the wrench-hold 90. The wrench-hold is ordinarily provided with a circular opening 91 and advantage is taken of this fact in holding collar 5a in place. This may be done by the insertion of a wedge 92. The cover 15a is then snapped into place as aforesaid and the entire valve is sealed against any tampering.

It will be noted with reference to this application of the invention that covers 15 and 15a are freely rotatable and therefore prevent any movement of the valve member 72. It will also be noted that skirt 95 extends below the lower surface of collar 5a and overhangs portion 96 of the valve body. As a result access to ring 5a is prevented. The skirt 97 of the lower anti-pilferage device also closely overhangs the valve body and prevents access to collar 5.

In the modification shown in Figure 6 the present invention is applied to a valve stem. The valve stem 106—156 is cut as shown at 100 and a channel member designated 101 is attached to portion 156 of the valve stem which protrudes from the valve body generally designated 105. The cut-off portion 106 of the valve stem has attached to it a member generally designated 107 which is similar to the member 101.

Members 101 and 107 are attached to their respective portions of the valve stems by a plurality of set screws 109.

Member 101 is formed with a tongue 110 and member 107 is formed with a slot 111 which cooperates with tongue 110 to transfer the rotary motion of member 107 to member 101 when the member 107 is turned by means of stem 106. The upper portion of stem 106 is provided with a hexagonal surface 112 or similar surface to receive a hand wheel of the valve.

Members 101 and 107 are formed with slots 115 and 116 respectively in which split rings 117 and 118, respectively are disposed. These rings are similar to that shown at 25 in Figure 3 and are of such size and configuration that when compressed the outer diameter of the ring will be slightly less than the inner diameter of housing 120. The housing 120 is closed at its upper end as shown at 121 and has a downwardly extending skirt portion 122 which completely covers gland nut 123. The wall of the housing 120 is provided with a plurality of holes 130 similar in size and configuration to holes 30 shown in Figure 3. In this instance, however, the holes 130 intersect the wall throughout the entire portion of their length.

The housing 120 is provided with a cap 140 which covers holes 130. The cap 140 may be fastened in place by sealing strips 141 which are hooked over staples 142 set in the upper wall 120 of the housing.

The housing 120 is provided with a circumferential groove 150 upon its inner surface opposite compressible ring 117 and groove 115 and is provided with another circumferential groove 151 opposite ring 118 and groove 116.

Grooves 150 and 151 are spaced so that when member 107 is locked in the position shown in Figure 6 slot 111 will be out of engagement with tongue 110.

As shown in Figure 6 the valve is locked in the open position and housing 120 is freely rotatable. Furthermore, stem 106 and member 107 are also freely rotatable relative to the housing and relative to the valve body 105. In order to unlock the valve a key similar to that shown in Figure 2 but divided upon a diameter and provided with a central aperture for stem 112 is inserted, both halves simultaneously, with the rods 52 in holes 130. The key must be divided in the event the valve handwheel, not illustrated, is in place upon stem 106, but may be in one piece if the valve handwheel is removable. The central aperture just mentioned enables the key to be inserted around the stem 106. The rods on the key are sufficiently long to reach to a level 155 which is between rings 117 and 118. The rods accordingly serve to compress ring 118 and do not reach nor compress ring 117. Due to the compression of ring 118 it is forced out of contact with groove 151 and the valve stem 112 and member 107 may accordingly be moved downwardly until the lower surface of member 107 comes in contact with the upper surface of member 101, with the tongue 110 in groove 111. The valve stem may then be rotated and will serve to rotate member 101 and the valve mechanism to open or close the valve as the case may be. The inward or outward movement of valve stem portion 156 due to opening or closing the valve merely serves to raise the entire housing 120 relative to the valve body 105 and skirt portion 122 is made sufficiently deep that it serves to cover gland nut 123 even when the valve stem 156 is in its full raised position.

After the valve has been adjusted either open or closed, the stem 112 is drawn upwardly until the ring 118 snaps into groove 151 and the valve will thereafter remain in that position.

When it is desired to remove the entire housing a key having rods sufficiently long to reach below groove 150 is inserted. This serves to compress ring 118 and also ring 117. The compression of the latter serves to release the housing 120 and may accordingly be drawn upwardly.

It is obvious that many variations may be made in the construction herein set forth and described without departing from the spirit of the invention described and claimed.

I claim as my invention:

1. An anti-pilferage device comprising a cylindrical body, a cover having an opening therein of a configuration neatly to receive said body, both the body and cover being formed with peripheral grooves, said grooves being positioned on the body and cover respectively so as to be opposite each other when the body and cover are in assembled relation, a compressible ring positioned in the said grooves, said ring being of a size and configuration so as to be completely removed from the groove in said cover when the ring is compressed and so as to lie partly in said cover groove when not compressed, said cover being formed with a plurality of openings parallel with the axis of said cylinder and intersecting said cover groove.

2. An anti-pilferage device comprising a cylindrical body having a peripheral groove formed in its outer surface, a collar neatly circumscribing said body, said collar having a groove on its inner surface to overlie the groove in said body when the collar is assembled upon said body, and a ring positioned in the groove of said body, said ring being formed for expansion partly into the groove of said collar when the body and collar are in assembled relation, a cap formed on said collar, the cap and collar being formed with apertures intersecting the lower part of the groove of the collar.

3. An anti-pilferage device comprising a cylindrical member having a peripheral groove in its outer surface, an inwardly compressible ring member positioned in said groove, a cap member having an end and being a recess shaped to receive said cylindrical member when said inwardly compressible ring member is compressed into said groove, said recess being formed with an integral groove to receive a portion of said compressible member when the cylindrical member groove is moved into alignment with said recess, said cap member also being formed with apertures extending from the closed end thereof parallel to the axis thereof and intersecting the bottom of the internal groove for receiving an unlocking device for compressing the compressible member to release the cap member.

4. A device comprising a cylindrical part, a cover member having a cylindrical opening for receiving the cylindrical part for sliding movement therein, cooperating grooves in the cover member and cylindrical part oriented in a plane at right angles to the axis of the cylindrical part, a split ring positioned in the space formed by said grooves, said ring having a relaxed diameter sufficiently large to cause it to lie partly in the groove of the part and partly in the groove of the member, said member being provided with a plurality of apertures extending parallel to the axis of the cylindrical opening therein and intersecting the groove of the member, said ring being adapted to be compressed to release the cylindrical part from the cover member by means of a key having push rods adapted to extend into each of the apertures and groove from the exterior of the member said rods being connected together for simultaneous movement.

5. A device comprising a cylindrical part, a cover member having a cylindrical opening for receiving the cylindrical part for sliding movement therein, cooperating grooves in the cover member and cylindrical part oriented in a plane at right angles to the axis of the cylindrical part, a split ring of rectangular cross section and of hardened material positioned in the space formed by said grooves, said ring having a relaxed diameter sufficiently large to cause it to lie partly in the groove of the part and partly in the groove of the member, said member being provided with a plurality of apertures extending axially of the cylindrical opening therein and intersecting the groove of the member.

6. An anti-pilferage pipe closure comprising a pipe cap formed with a cylindrical outer surface, a groove in the surface in a plane at right angles to the axis of the cap, a cover member for the pipe cap formed with a cylindrical opening for slidingly receiving the cap, said cover member being formed with a cooperating groove oriented to overlie the groove of the pipe cap when the latter is completely within the opening of the cover member, a resilient split ring having a diameter such that it rests partly in the groove of the cap and partly in the groove of the cover member when the ring is in its relaxed condition, the cover member also being formed with a plurality of spaced apertures extending parallel to the axis thereof and intersecting the groove of the cover member.

ANDREW McWALTERS.